(12) United States Patent
Hoskins

(10) Patent No.: US 6,457,245 B1
(45) Date of Patent: Oct. 1, 2002

(54) MULTI-BIT OPTICAL SENSOR CODE WHEEL

(75) Inventor: Steven R. Hoskins, Walled Lake, MI (US)

(73) Assignee: Methode Electronics, Inc., Chicago, IL (US)

( * ) Notice: Subject to any disclaimer, the term of this patent is extended or adjusted under 35 U.S.C. 154(b) by 16 days.

(21) Appl. No.: 09/827,217

(22) Filed: Apr. 5, 2001

(51) Int. Cl.[7] ............................................. G01B 11/26
(52) U.S. Cl. ............................. 33/1 PT; 33/707; 33/600
(58) Field of Search .................................. 33/1 N, 1 PT, 33/613, 645, 534, 563, 600, 707

(56) References Cited

U.S. PATENT DOCUMENTS

| | | | | |
|---|---|---|---|---|
| 2,619,002 A | * | 11/1952 | Baker | 33/1 N |
| 2,944,157 A | * | 7/1960 | McAuslan et al. | 33/1 PT |
| 3,096,444 A | * | 7/1963 | Seward | 33/1 PT |
| 3,098,300 A | * | 7/1963 | Zieher | 33/534 |
| 4,414,754 A | * | 11/1983 | Lapeyre | 33/707 |
| 4,529,964 A | * | 7/1985 | Minami et al. | 33/707 |
| 5,218,769 A | * | 6/1993 | Tranchon | 33/1 N |
| 6,237,243 B1 | * | 5/2001 | Cook | 33/758 |
| 6,272,912 B1 | * | 8/2001 | Sano | 33/1 N |
| 6,311,401 B1 | * | 11/2001 | Neckel et al. | 33/1 N |

* cited by examiner

Primary Examiner—G. Bradley Bennett
(74) Attorney, Agent, or Firm—Blank Rome LLP

(57) ABSTRACT

A rotary position sensor that contains multiple bits of positional data is provided. The rotary position sensor includes an overmold and an applique that is applied to the overmold. The applique includes a clear film upon which the multiple bits of positional data can be screen printed. The rotary position sensor can be utilized in a variety of different applications to determine a position being sensed, such as, those applications relating to determining the position of an automotive steering wheel during operation.

25 Claims, 3 Drawing Sheets

MULTI-BIT OPTICAL SENSOR CODE WHEEL

BACKGROUND OF THE INVENTION

1. Field of the Invention

The present invention generally relates to rotary sensors and methods of determining position that utilize the rotary sensors. More specifically, the present invention relates to rotary sensors that contain code relating to bits of positional data and methods of determining position that utilize the same by sensing and encoding- the positional data.

2. Discussion of the Background

Automotive original equipment manufacturers utilize more and more electronics in automotive vehicle steering systems and assemblies. These systems include, for example, four-wheel steering, electric power assisted steering, EVO, automatic roll stability, and other like systems.

Typically, optical steering wheel angle sensors have been utilized to provide the necessary positional data -that is required by the vehicle steering systems. Conventional steering wheel angle sensors include a code wheel that is utilized to break a beam of light as the steering wheel moves during operation. This creates a series of electrical pulses that can be interpreted electronically to detect the position of the steering wheel during operation.

In general, the conventional code wheels are metal stamped or molded to provide holes therein for permitting light to pass therethrough. In addition, glass etched code wheels utilize the etched surfaces to block the light wherein clear areas on these code wheels permit light to pass through. The CCD chip utilizes an LED and code wheel arrangement as well. The CCD chip scans multiple bits of data radially rather than detecting single on/off pulses associated with the light/dark areas of the glass etched surface.

However, there are a number of problems associated with conventionally used optical steering wheel angle sensors. For example, the scanning operation of the CCD chip makes it difficult to use a standard metal stamped or molded code wheel. In addition, metal stamp code wheels have tooling limitations. The progressive dye which is used to create the metal stamped code wheel is limited to the size and spacing of the punches that are required to make the holes. Molded plastic code wheels have similar issues as well. An etched glass surface is cost prohibitive particularly if utilized in an assembly line process, such as with automotive applications.

A need, therefore exists, to provide a rotary sensor that reduces tooling costs, that provides precise and accurate positional data and that can be easily incorporated into the position sensing system, such as those relating to automotive steering wheel assemblies.

SUMMARY OF THE INVENTION

The present invention provides a rotary sensor that contains code relating to bits of positional data or information. The positional data can be sensed and encoded to determine or detect a position associated with the encoded data. The rotary sensor of the present invention can be utilized in a variety of different applications, such as those relating to automotive steering wheel assemblies. In this regard, a precise and accurate determination can be made with respect to the position of the steering wheel during operation.

To this end, in an embodiment of the present invention, a rotary position sensor is provided. The rotary position sensor includes an overmold, such as a code wheel overmold, and an applique containing code associated with bits of information wherein the applique is applied to the overmold.

In another embodiment, a method of determining a position that utilizes encoded bits of information is provided. The method includes the steps of providing a rotary position sensor that includes a code wheel overmold and an applique applied to the overmold wherein the applique contains code associated with bits of information relating to positional data; sensing and encoding the code; and determining a position associated with the encoded bits of information.

In yet another embodiment, an automotive steering wheel position sensor is provided. The steering wheel position sensor includes a code wheel overmold and a code wheel applique that is applied to the code wheel overmold wherein the code wheel applique contains a code associated with bits of information.

It is, therefore, an advantage of the present invention to provide a rotary position sensor that includes an applique which contains bits of positional data.

Another advantage of the present invention is to utilize the rotary position sensor to determine a position by sensing and encoding bits of positional data associated with the rotary position sensor.

A further advantage of the present invention is to determine the position of an automotive steering wheel during operation.

A still further advantage of the present invention is to provide a rotary position sensor that can be manufactured at reduced costs and that can be readily incorporated into a position detection system.

Yet another advantage of the present invention is to provide a rotary position sensor that can precisely and accurately determine the position of an automotive steering wheel during operation.

Additional features and advantages of the present invention are described in, and will be apparent in the detailed description of the presently preferred embodiments and from the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention provides a rotary position sensor that contains multiple bits of information relating to positional data which can be sensed and encoded to determine a position that is being detected. The rotary position sensor of the present invention can be utilized in a variety of different applications. In particular, the rotary position sensor is utilized to determine a position of an automotive steering wheel during operation thereof.

In an embodiment, the rotary position sensor includes an overmold and an applique containing code associated with bits of information, such as positional information. The applique is applied to the overmold in any suitable way, such as by adhesion or other like process that can attach the applique to the overmold.

The overmold can include a variety of different materials. Preferably, the overmold is a code wheel overmold that is made of clear plastic. In an embodiment, the overmold includes nylon, polycarbonate, acrylic or other like materials.

Figure 1:
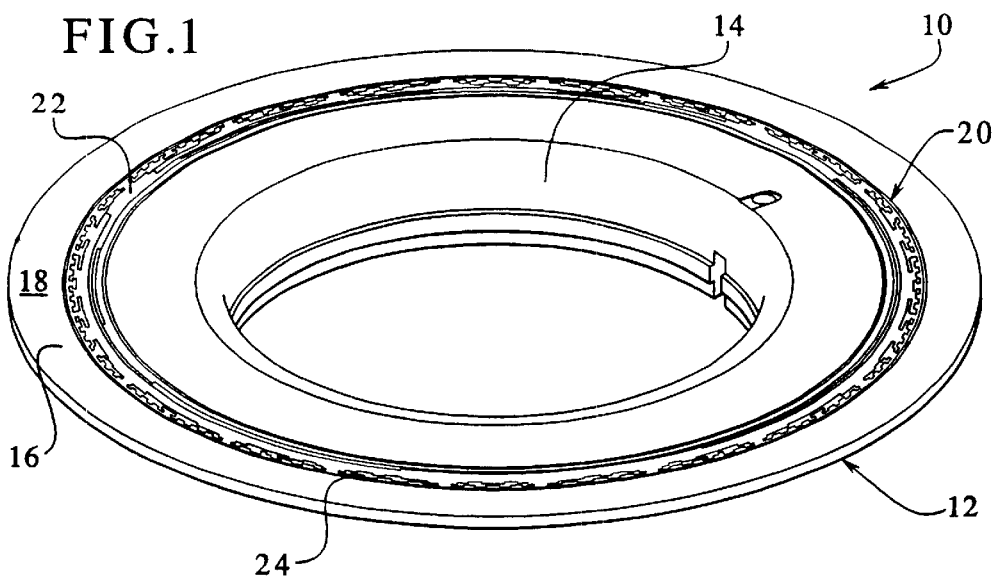
FIG. 1 illustrates a first embodiment of the rotary position sensor of the present invention.
Figure 2:
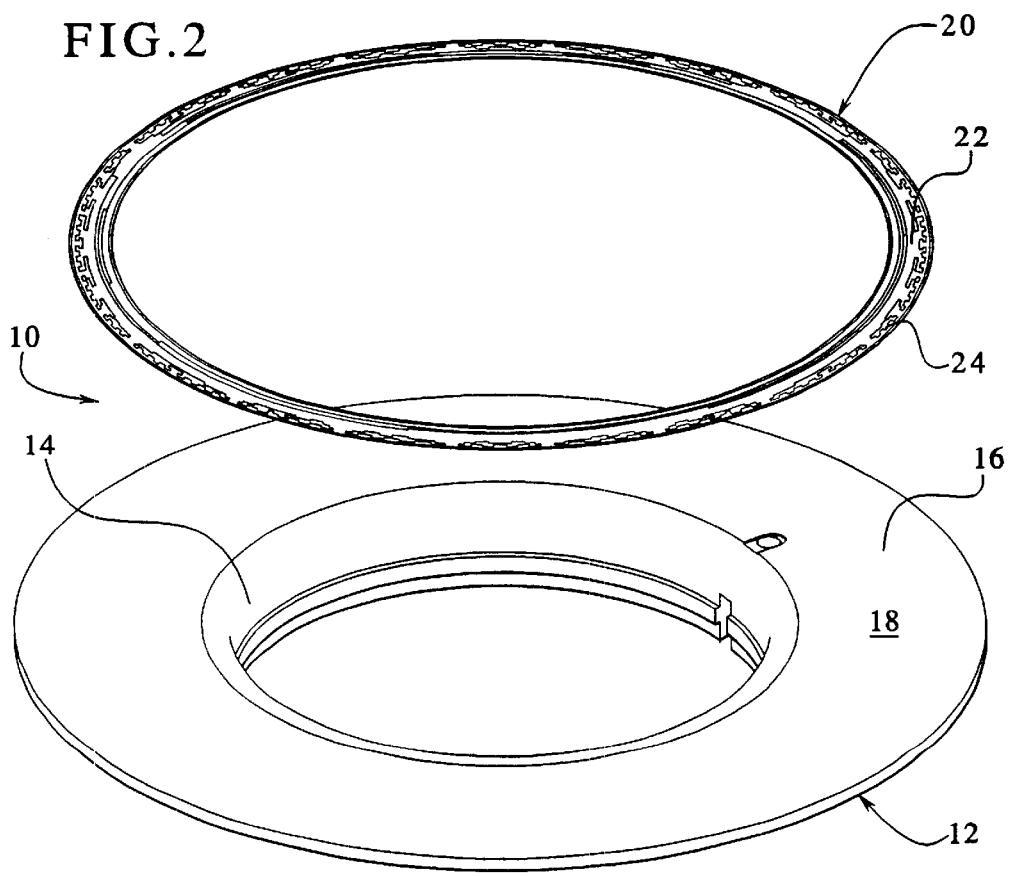
FIG. 2 illustrates an exploded view of the rotary position sensor of FIG. 1.

Turning to FIGS. 1 and 2, a preferred embodiment of present invention is illustrated. The rotary position sensor 10 can include an overmold 12, such as a code wheel overmold, and an applique 20. The code wheel overmold 12 includes an annular member 14 and a circular member 16 that extends outwardly and radially from the annular member 14. The circular member 16 includes a surface 18 where the applique 20 is applied thereto. The present invention is not limited to the code wheel overmold 12 as illustrated in FIGS. 1 and 2. The overmold 12 of the present invention can include a variety of different configurations.

As further illustrated in FIGS. 1 and 2, the applique 20 is applied to the overmold 12 as previously discussed. The applique 20 can be configured in a variety of different ways. Preferably, the applique is circular in shape as illustrated in FIGS. 1 and 2.

The applique 20 can made of a variety of different materials. Preferably, the applique includes a clear film 22 upon which the code 24 is contained. In an embodiment, the code 24 which includes multiple bits of information is screen printed onto the clear film 22 such that the code 24 is an opaque printing. The screen printed code is preferably encapsulated in any suitable way, such as with a clear plastic film or other like material.

The code 24 can include a variety of informational data. Preferably, this data relates to positional data, such as data relating to the position of an automotive steering wheel. The code can also include any suitable amount of bits of information such that it provides both accurate and precise data relating to a position being detected. Preferably, the amount of bits of information includes eight or more bits of information.

In another embodiment, the present invention provides a method of determining a position being detected that utilizes encoded bits of information. The method provides a rotary position sensor 10 as previously discussed. The code of the rotary position sensor 10 is sensed and encoded to determine a position associated with the encoded bits of information.

The rotary position sensor 10 of the present invention can be utilized in a variety of different applications. Preferably, the rotary position sensor 10 is utilized to determine an automotive steering wheel position during operation thereof. In this embodiment, the rotary position sensor 10 contains code associated with bits of information relating to positional data further associated with the automotive steering wheel.

In an embodiment, the rotary position sensor is attached to or incorporated within a steering wheel assembly of the automotive steering wheel. The rotary position sensor can be attached to the steering wheel assembly in any conventional manner. The rotary position sensor can be a discrete part of the steering wheel assembly. In another embodiment, the rotary position sensor is an integral part of any suitable component of the steering wheel assembly.

For example, the rotary position sensor can be an integral part of a clock spring hub of the steering wheel assembly.

The automotive clock spring is an electrical connector which electrically connects a rotatable airbag assembly mounted on the steering column to stationary crash sensors located elsewhere on the vehicle. Typically, the clock spring hub of the automotive clock spring is attached to the rotatable air bag assembly which is mounted on the steering column.

In another embodiment of the invention, the code 24 can be inversely printed on the applique 20. In this embodiment, the code 24 is an opaque printing.

Figure 3:
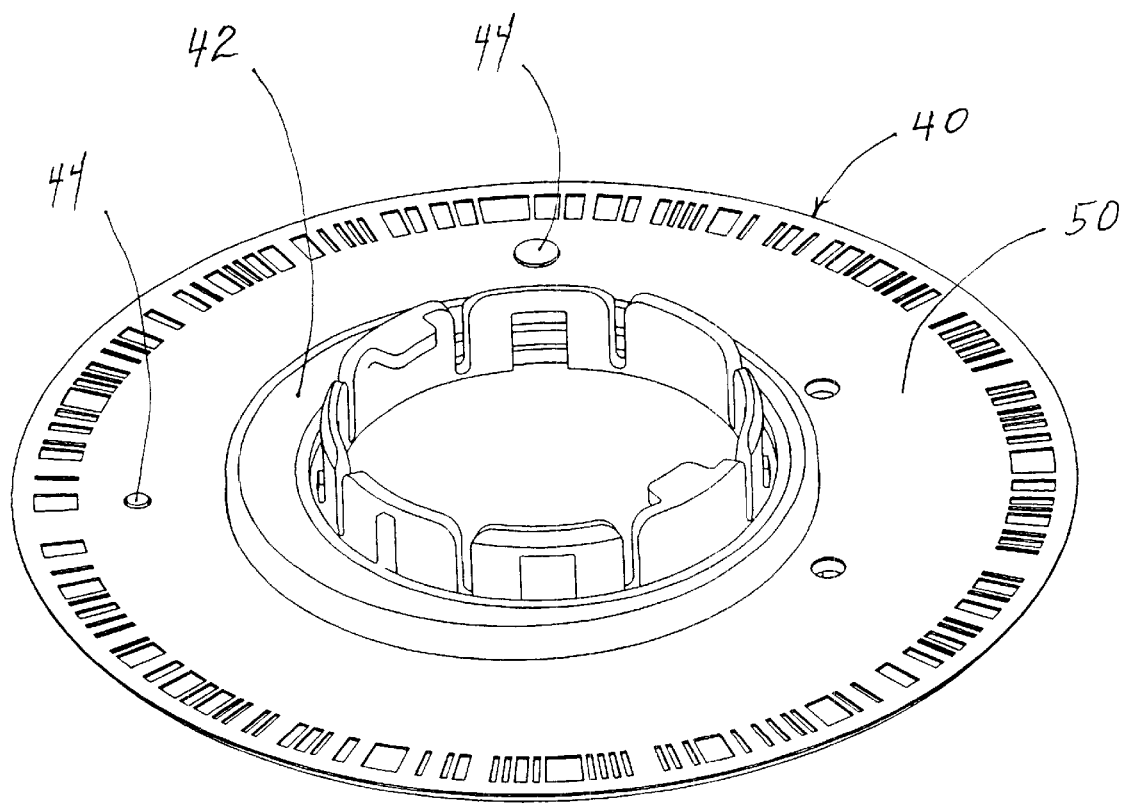
FIG. 3 illustrates a second embodiment of the rotary position sens or of the present invention.

In yet another embodiment of the invention, the rotary position sensor 40 takes the form illustrated in FIG. 3. The rotary position sensor 40 includes a base 42 and an applique 50.

Figure 4:
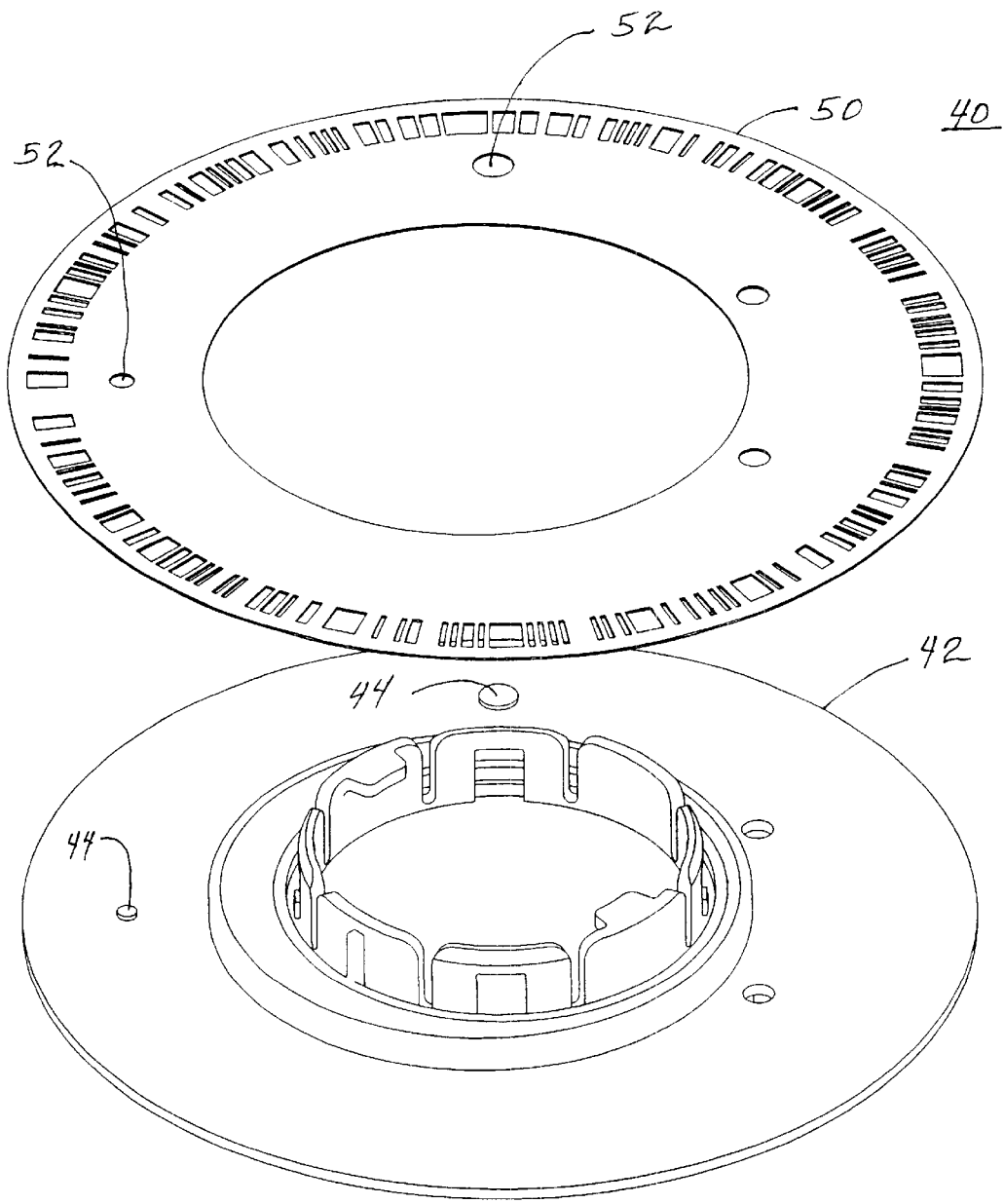
FIG. 4 illustrates an exploded view of the rotary position sensor of FIG. 3.

FIG. 4 is an exploded perspective view of the rotary position sensor 40 of FIG. 3. The applique 50 is mounted or keyed to the base 42 by way of bumps 44 formed on the base and apertures 52 formed on the applique 50. The applique 50 can be attached to the base 42 by an adhesive or any other suitable bonding device, apparatus, or agent.

The code 54 on the applique 50 is that of the commonly used bar code. Furthermore, the code 54 can be printed on the applique 50 using an inverse printing technique as discussed above. In use, the operation of the rotary position sensor 40 is the same as the operation of the rotary position sensor 10 as described above and is not discussed further.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that all such changes and modifications be covered by the appended claims.

What is claimed is:

1. A rotary position sensor comprising an ovennold and an applique having a code associated with bits of information wherein the applique is applied to the overmold.

2. The rotary position sensor of claim 1 wherein the bits of information relate to positional data.

3. The rotary position sensor of claim 2 wherein the positional data relates to a position of an automotive steering wheel during operation.

4. The rotary position sensor of claim 1 wherein the overmold is a clear plastic.

5. The rotary position sensor of claim 1 wherein the overmold is selected from the group consisting of nylon, polycarbonate and acrylic.

6. The rotary position sensor of claim 1 wherein the applique includes a clear film.

7. The rotary position sensor of claim 6 wherein the code is screen printed onto the clear film.

8. The rotary position sensor of claim 7 wherein the code is an opaque printing.

9. The rotary position sensor of claim 1 wherein the code is an inverse printing.

10. The rotary position sensor of claim 1 wherein the bits of information include eight or more bits of information.

11. A method of determining a position that utilizes encoded bits of information, comprising the steps of:
   providing a rotary position sensor including a code wheel overmold and an applique applied to the overmold wherein the applique contains a code associated with bits of information relating to positional data;
   sensing and encoding the code; and
   determining a position associated with the encoded bits of information.

12. The method of claim 11 wherein the code includes eight or more bits of information.

13. The method of claim 11 fuirther comprising attaching the rotary position sensor to a steering wheel assembly.

14. The method of claim 11 wherein the overmold is a clear plastic.

15. The method of claim 11 wherein the applique includes a clear film.

16. The method of claim 14 wherein the code is an opaque printing that is screen printed onto the clear film of the applique.

17. An automotive steering wheel position sensor comprising a code wheel overmold and a code wheel applique applied to the code wheel overmold wherein the code wheel applique contains a code associated with bits of information.

18. The automotive steering wheel position sensor of claim 17 wherein the code contains bits of information relating to positional data.

19. The automotive steering wheel position sensor of claim 17 wherein the code wheel overmold is a discrete part of an automotive steering wheel assembly.

20. The automotive steering wheel position sensor of claim 17 wherein the code wheel overmold is an integral part of a component of an automotive steering wheel assembly.

21. The automotive steering wheel position sensor of claim 20 wherein the component is a clock spring hub.

22. A rotary position sensor comprising a base and an applique having a code associated with bits of information wherein the applique is mounted on the base.

23. The rotary position sensor of claim 22 wherein the base includes a bump, and wherein the applique includes an aperture, and wherein the bump is positioned within the aperture so as to position the applique relative to the base.

24. A method of determining a position that utilizes encoded bits of information, comprising the steps of:

providing a rotary position sensor including a base and an applique applied to the base wherein the applique contains a code associated with bits of information relating to positional data;

sensing and encoding the code; and determining a position associated with the encoded bits of information.

25. An automotive steering wheel position sensor comprising a base and an applique mounted on the base wherein the applique contains a code associated with bits of information.

* * * * *